3,355,411
COATING COMPOSITION FOR PRIMING PVC SURFACES
Neville B. Stokes and Christopher M. Allen, Leicester, England, assignors to United Shoe Machinery Corporation, Flemington, N.J., and Boston, Mass., a corporation of New Jersey
No Drawing. Filed Nov. 21, 1966, Ser. No. 595,611
Claims priority, application Great Britain, Nov. 27, 1965, 50,495/65
3 Claims. (Cl. 260—30.4)

ABSTRACT OF THE DISCLOSURE

A composition for priming polyvinyl chloride surfaces for attachment by an adhesive comprising an ethylene polyvinyl acetate copolymer comprising a solution of an ethylene vinyl acetate copolymer and an after-chlorinated polyvinyl chloride in a solvent comprising tetrahydrofuran.

---

This invention relates to coating compositions and more particularly it relates to improved primer compositions useful in preparing work parts having bonding surfaces of polyvinyl chloride for bonding by means of ethylene vinyl acetate copolymer adhesives. This invention further relates to improved bonding methods employing the improved primer.

The use of hot melt, or thermoplastic adhesive compositions for bonding surfaces together is increasing. A particular field in which such increase is evident is in the manufacture of shoes. One type of such hot melt adhesive composition comprises ethylene vinyl acetate copolymer.

In the manufacture of shoes where the upper comprises a surface of polyvinyl chloride, it is usual to bond thereto a bottom unit of resin rubber, it being necessary to bond the bottom unit to an inturned lasting margin of the upper, this lasting margin thus providing a polyvinyl chloride bonding surface. Resin rubber is a material comprising a butadiene styrene copolymer having a fairly high proportion of styrene.

In general, a satisfactory adhesive composition for use in shoe manufacture must satisfy at least three criteria: If it is a heat activated adhesive it must be activated at a convenient temperature; it must provide adequate adhesion or bond strength; and it must show adequate heat resistance.

While there are compositions available comprising ethylene vinyl acetate copolymers which satisfy these criteria and which may be used satisfactorily as adhesive compositions for many types of materials used in shoe manufacture, it has been found that when using ethylene vinyl acetate copolymer compositions for bonding resin rubber surfaces to polyvinyl chloride surfaces, in order to obtain adequate adhesion to the polyvinyl chloride surfaces, a vinyl acetate content in the copolymer of more than 30% is required. However, compositions comprising copolymers with such a high vinyl acetate content tend to show inadequate creep resistance.

To the end that a bond may be obtained between a resin rubber surface and a polyvinyl chloride surface using an adhesive composition comprising ethylene vinyl acetate copolymer not exceeding 30% vinyl acetate, a method has been proposed in which a coating of a solution of ethylene vinyl acetate copolymer is applied to the polyvinyl chloride surface before the bond is formed.

While this method has provided an improved bond, when used with some polyvinyl chloride materials, for example expanded materials, commercially acceptable bonds may not result.

Accordingly, it is one of the various objects of this invention to provide an improved method of bonding a polyvinyl chloride surface to a second surface in which a hot melt ethylene vinyl acetate copolymer adhesive may be employed without necessitating a vinyl acetate content in the copolymer of more than 30%.

It is another of the objects of this invention to provide an improved priming composition useful for preparing surfaces of polyvinyl chloride to be bonded to second surfaces with an adhesive comprising ethylene vinyl acetate copolymer.

We have found that an effective bond may be obtained between a resin rubber surface and a polyvinyl chloride surface using an adhesive composition comprising ethylene vinyl acetate copolymer, if a coating of a solution of ethylene vinyl acetate copolymer and after chlorinated polyvinyl chloride is first applied to the polyvinyl chloride surface as a primer. We have found that even with relatively small quantities of after chlorinated polyvinyl chloride in the solution, acceptable bonds may be formed between certain types of polyvinyl chloride upper materials and resin rubber sole material, and that as the part ratio of after chlorinated polyvinyl chloride to ethylene vinyl acetate copolymer is increased from 10:100 to 200:100 (i.e. from 10% to 200% of the weight of the copolymer) there is an improvement in the bonds formed between the polyvinyl chloride and the resin rubber. However, we have found that it is difficult to use mixtures or after chlorinated polyvinyl chloride and suitable ethylene vinyl acetate copolymers in which the ratio of the former to the latter is greater than 2:1 because then the two become incompatible, and fusion between the adhesive composition and the coating becomes increasingly difficult to achieve by a heat reactivation process.

We have also found that it is advisable to use for the primer composition an ethylene vinyl acetate copolymer comprising from 18% to 30% vinyl acetate. If ethylene vinyl acetate copolymers having a vinyl acetate content of less than 18% are used, it is difficult to form a solution containing an appreciable amount of copolymer which is readily applicable: A 10% by weight solution in tetrahydrofuran of a copolymer comprising 18% vinyl acetate is a gel at 40° C. and a liquid for convenient application only when heated to 70° C. We have also found that if the vinyl aceate content exceeds 30%, then both the strength of the bond formed and its creep resistance are reduced. Copolymers of ethylene vinyl acetate having a 30% vinyl acetate content have been found to be satisfactory when having a melt index of 3 (as measured according to ASTM D–1238–57T), but not when having a melt index of 15.

According to the present invention, the improved priming composition provided hereby comprises a volatile non-reactive organic solution of between two and ten parts by weight per hundred parts of solution of the hereinbefore described ethylene vinyl acetate copolymer and after chlorinated polyvinyl chloride. While the solvent may comprise tetrahydrofuran alone, we have found that the tetrahydrofuran may be diluted with up to nine parts of toluol while providing adequate bonds, although there is an improvement in bonds as the solvent is varied from this ratio to tetrahydrofuran alone. We have preferred to use a six to one proportion for a suitable balance of cost and efficacy. Other solvents which may be employed as a diluent for tetrahydrofuran are trichloroethylene, methylene chloride, carbon tetrachloride, while xylol, acetone, methyl ethyl ketone or ethyl acetate may also be used but in smaller proportions.

A priming composition suitable for the above described process of bonding a resin rubber sole to a PVC upper is illustrated by the following example:

EXAMPLE I

| | Parts |
|---|---|
| Ethylene vinyl acetate copolymer | 100 |
| After chlorinated polyvinyl chloride | 100 |

The above solids were dissolved in tetrahydrofuran to give a solution of 5% total solids. The copolymer has a vinyl acetate content of 30% and a melt index of 3 and is sold under the trade name of Elvax 60, while the after chlorinated polyvinyl chloride which has a chlorine content of 64% is sold under the trade name of Genclor S.

In carrying out the illustrative method, the illustrative solution of Example I is applied to the lasting margin by means of a brush or roller, the lasting margin previously having been laid flat across the bottom of the shoe. The illustrative solution is allowed to dry. Marginal portions of the outsole which are to engage the lasting margin are coated with a hot melt adhesive composition suitably comprising the ethylene vinyl acetate copolymer of Example I and a terpene phenolic resin in the ratio of 2:1. A suitable resin may be obtained commercially under the trade name Durez Resin 12603. The adhesive composition is allowed to cool.

The two surfaces are then reheated, the lasting margin of the upper about 100° C. and the outsole to about 135° C., and while the adhesive composition is hot the lasting margin and the outsole are pressed firmly together.

So called "peel" and "creep" tests were carried out to compare the performance of the illustrative solution with the performance under similar conditions of a solution A comprising 10% by weight of Elvax 260 in tetrahydrofuran, and a solution B comprising 2% by weight of Elvax 260 in tetrahydrofuran. Specimens of PVC coated fabric upper material/resin rubber sole material and an expanded PVC upper material/resin rubber sole material bonds were prepared using each of the solutions. The specimens were prepared in the following way:

(1) One inch wide strips of polyvinyl chloride material were coated with solution and allowed to dry for fifteen minutes.

(2) One inch wide strips of resin rubber sole material were coated with a hot melt adhesive composition comprising 100 parts by weight of Elvax 260 and fifty parts by weight of Durez Resin 12603 and the hot melt adhesive composition allowed to cool.

(3) The strips were then heated, the polyvinyl chloride material to 100° C. and the resin rubber sole material to 135° C.

(4) The polyvinyl chloride material strips were pressed firmly against the resin rubber sole material strips and bond formed.

In the peel test the bond strengths were compared by measuring the force which was required to peel apart an inch wide specimen at a rate of two inches per minute. This test was carried out on specimens which had been aged for one day at room temperature, and on specimens which had been artificially aged as a result of being kept for fourteen days at 50° C. and three days at room temperature. The results are shown in a Table I.

TABLE I

| Solution | Surfaces | Age of Bond | Bond, lbs/in. | Type of Failure, Percent |
|---|---|---|---|---|
| Solution A | PVC Coated Fabric/Resin Rubber Sole Material. | One Day at Room Temp. | 25-27 | 70 c/p, 30 S.* |
| Solution B | | | 26-27 | 25 u, 60 c/p, 15 S.* |
| Illustrative Solution | | | 30-31 | 5 c/p, 25 S, 70 S.* |
| Solution A | Expanded PVC/ Resin Rubber Sole Material. | | 5-6 | 100 c/u. |
| Solution B | | | 7-8 | 100 c/u. |
| Illustrative Solution | | | 8-10 | 100 u. |
| Solution A | PVC Coated Fabric/Resin Rubber Sole Material. | 14 Days at 50° C. plus 3 Days at Room Temp. | 15-17 | 100 c/p. |
| Solution B | | | 17-18 | 100 c/p. |
| Illustrative Solution | | | 32-34 | 5 c/p, 95 c/s. |
| Solution A | Expanded PVC/ Resin Rubber Sole Material. | | 2-3 | 100 c/p. |
| Solution B | | | 2½-3½ | 100 c/p. |
| Illustrative Solution | | | 12 | 100 u. |

Key to failures:
c/u—cement peeling from the upper.
c/p—cement peeling from the primer.
u—upper tear.
c/s—cement peeling from the soling.
S*—superficial sole tear.
S—sole tearing.

From Table I it will be seen that the bond strengths of the specimens made using the illustrative solution were greater than the bond strengths of specimens of similar materials made using solutions A and B, and that this is particularly evident with the specimens which had been artificially aged, the bond strengths for the PVC coated fabric/resin rubber sole material specimens prepared using the illustrative solution being approximately twice those achieved for these materials with each of the other solutions, and the bond strengths of the Expanded PVC/ resin rubber sole material specimens prepared using the illustrative solution being approximately four times those achieved on these materials with each of the other solutions.

Further, it will be seen from Table I that the specimens prepared using the illustrative solution tended to fail as a result of tearing of the material or as a result of cement peeling from the resin rubber sole material, rather than as a result of peeling of adhesive from the polyvinyl chloride surface, whereas the specimens prepared using solutions A and B tended to fail as a result of adhesive peeling from the polyvinyl chloride surface.

In the creep test the rate of movement of the bond was measured when subjected to a load of 600 grams at 50° C. This test was carried out on specimens which had been aged for one day at room temperature, on specimens which had been artificially aged by being kept for fourteen days at 50° C. and three days at room temperature, and on specimens which had been aged for three weeks at room temperature. The results are shown in Table II.

TABLE II

| Age of Bond | Solution A | | Solution B | | Illustrative Solution | |
|---|---|---|---|---|---|---|
| | 2 hrs. | 4 hrs. | 2 hrs. | 4 hrs. | 2 hrs. | 4 hrs. |
| 1 day at room temp. | 1⅛" / 1¾" | >2" / >2" | ¼" / 1/16" | ⅝" / 5/16" | 0 / 0 | 0. / 0. |
| 14 days at 50° C. +3 days at room temp. | >2" / >2" / (5–10 mins.) | | >2" / >2" | | ½" / 9/16" | 1 1/16" / 1⅛". |
| 3 weeks at room temp. | >2" / >2" / (1½–2 hours) | | 1¼" / 1¾" | >2" / >2" | 0 / 0 | 0. / 0. |

The times shown in parentheses are the times taken for the bond line to move a distance of two inches.

From Table II it will be seen that bonds formed using the illustrative solution showed an improved performance as compared with the bonds formed using solutions A and B.

Having thus described our invention, what is claimed as new and desired to secure by U.S. Letters Patent is:

1. A priming composition for use on surfaces of polyvinyl chloride to be bonded to second surfaces with an ethylene vinyl acetate copolymer, the said priming composition consisting essentially of a solution of equal parts by weight of (a) an ethylene vinyl acetate copolymer comprising 18% to 30% vinyl acetate and having a melt index of less than 15, and (b) an after chlorinated polyvinyl chloride containing approximately 64% chlorine in a solvent comprising tetrahydrofuran said solution having about two to ten parts by weight of solids per hundred parts by weight of solution.

2. A composition as defined in claim 1 wherein the solvent consists essentially of a mixture of toluol and tetrahydrofuran.

3. A priming composition as defined in claim 1 wherein said solvent consists of a mixture of six parts of toluol to one part of tetrahydrofuran, said solution having about five parts of solids per hundred parts by weight of solution.

References Cited

UNITED STATES PATENTS

| | | | |
|---|---|---|---|
| 2,426,080 | 8/1947 | Chapman | 260—96 |
| 2,492,929 | 12/1949 | Cornthwait | 260—30.4 |
| 2,703,794 | 3/1955 | Roedel | 260—27 |
| 2,802,801 | 8/1957 | Reid | 260—30.4 |
| 3,086,952 | 4/1963 | Newton | 260—30.4 |
| 3,251,817 | 5/1966 | Hahn | 260—30.4 |

OTHER REFERENCES

Skeist: Handbook of Adhesives, 1962, pp. 559, 339, and 340, 352, 483.

Doolittle: Technology of Solvents and Plasticizers, 1954, p. 528.

Chemistry and Eng. News, vol. 26, No. 23, June 7, 1948, p. 1688.

JULIUS FROME, *Primary Examiner.*